(12) United States Patent
Su

(10) Patent No.: US 6,322,032 B1
(45) Date of Patent: Nov. 27, 2001

(54) BASE ASSEMBLY FOR A WINDSHIELD SUNSHADE OF AN AUTOMOBILE

(76) Inventor: Shu-Chen Su, P.O. Box 90, Tainan City (TW)

( * ) Notice: Subject to any disclaimer, the term of this patent is extended or adjusted under 35 U.S.C. 154(b) by 0 days.

(21) Appl. No.: 09/664,371

(22) Filed: Sep. 18, 2000

(51) Int. Cl.⁷ .................................. E04G 3/00; B60J 1/20
(52) U.S. Cl. .................................. 248/292.12; 296/97.7; 160/370.22
(58) Field of Search ................................. 296/97.6, 97.7, 296/97.8, 97.9, 97.13; 248/292.12; 160/370.22

(56) References Cited

U.S. PATENT DOCUMENTS

| | | | |
|---|---|---|---|
| 5,562,144 | * 10/1996 | Ming-Shun | 160/370.22 |
| 5,896,910 | * 4/1999 | Chen | 160/370.22 |
| 6,079,683 | * 6/2000 | Lin | 248/292.12 |

* cited by examiner

Primary Examiner—Alvin Chin-Shue

(57) ABSTRACT

A base assembly for a windshield sunshade of an automobile includes a base unit with an engagement portion, a pivot coupler with a coupling rod, a sunshade holder housing the coupling rod, and pivot members pivotally combining the pivot coupler with the engagement portion. An insertion block inserted through two insertion holes of sunshade holder and two opposite grooves of the coupling rod is adapted to limit against a spring within a cavity of the pivot coupler. Two opposite projecting ridges respectively positioned at two opposite sidewalls of the sunshade holder are engaged with two opposite engagement recesses of the base unit in a position. When the sunshade holder is outwardly pulled, the insertion block will be slided in the grooves with an outward movement to compress the spring to make the two projecting ridges separated from the two opposite engagement recesses so as to permit the sunshade holder rotated and adjusted with various angles, by which the base assembly is assembled easily and quickly and is more convenient in practical use.

2 Claims, 5 Drawing Sheets

BASE ASSEMBLY FOR A WINDSHIELD SUNSHADE OF AN AUTOMOBILE

BACKGROUND OF THE INVENTION

1. Field of the Invention

This invention relates to a base assembly for a windshield sunshade of an automobile, particularly having a sunshade holder being manually pulled outwardly from a coupling rod of a pivot coupler, by which an insertion block of sunshade holder can compress a spring so that the sunshade holder can be separated from engagement recesses of a base unit and is adapted to be adjusted with various angles under the rotation of the pivot coupler, which the base assembly in the present invention is assembled easily and quickly and is more convenient for a user to operate in practical use.

2. Description of the Prior Art

A known conventional windshield sunshade of an automobile as shown in FIGS. 1 and 2 includes a support base 10, a shade curtain 11, a circular rod 12, an upper position block 13, and a support rod 14 combined together.

The support base 10 has a plurality of threaded holes 100 in a bottom plate for screws 101 to fix the support base 10 on a flat surface 15 in front of a rear windshield sunshade of an automobile, a lengthwise curved-up portion 102 at a rear end for receiving the sunshade curtain 11 and the circular rod 12 therein, and an insertion recess 103 in a center of the top surface.

The shade curtain 11 has a pull grip 110 on an upper center end, which can be hung on a hook 130 of the position block 13. The position block 13 also has a hole base 131 formed in a lower portion, and a curved-down portion 132 in a top to be fitted firmly with a lateral strip at a roof connect line 16 between a rear windshield and the roof of an automobile. Then the support rod 14 has an upper end inserted in the an insertion recess 103 of the support base 10 and a lower end inserted in the hole base 131 of the position block 13. In case of need, the shade curtain 11 is pulled outwardly from the lengthwise curved-up portion 102 with the pull grip 110 being manually moved up to hang on the hook 130 of the position block 13 for shading the rear windshield.

However, the support base 10 of the known conventional windshield sunshade of an automobile is fixed in a definite preset direction, unable to adapt to various angles of different rear windshields of many styles of automobiles, which becomes a limit and disadvantage in practical use.

SUMMARY OF THE INVENTION

The main purpose of the invention is to offer a base assembly for a windshield sunshade of an automobile with a sunshade holder adapted to be adjusted with various angles, which can be assembled easily and quickly and is more convenient for a user to operate in practical use.

The main feature of the invention is to have a base unit with a plurality of engagement recesses each two respectively disposed in two opposite sidewalls of an engagement portion therein; a pivot coupler including a pivot base with a coupling rod disposed at one sidewall, a cavity located in an interior of the pivot base and passing through a central through hole of the pivot base and extending to a middle portion of the coupling rod, two opposite grooves respectively disposed in two opposite sidewalls of the coupling rod, and a spring placed in the cavity; a sunshade holder including a curved-up plate with a coupling housing disposed at one sidewall, a chamber located in an interior of the coupling housing for housing the coupling rod, two projecting ridges respectively positioned at two opposite sidewalls of the coupling housing and extending to the curved-up plate and engaged with the engagement recesses of the base, two insertion holes respectively disposed at the two opposite sidewalls of the coupling housing and communicating with the chamber, and an insertion block adapted to be inserted through the two insertion holes of the coupling housing and the two opposite grooves of the coupling rod so as to limit against the spring within said cavity of the coupling rod of said pivot coupler.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
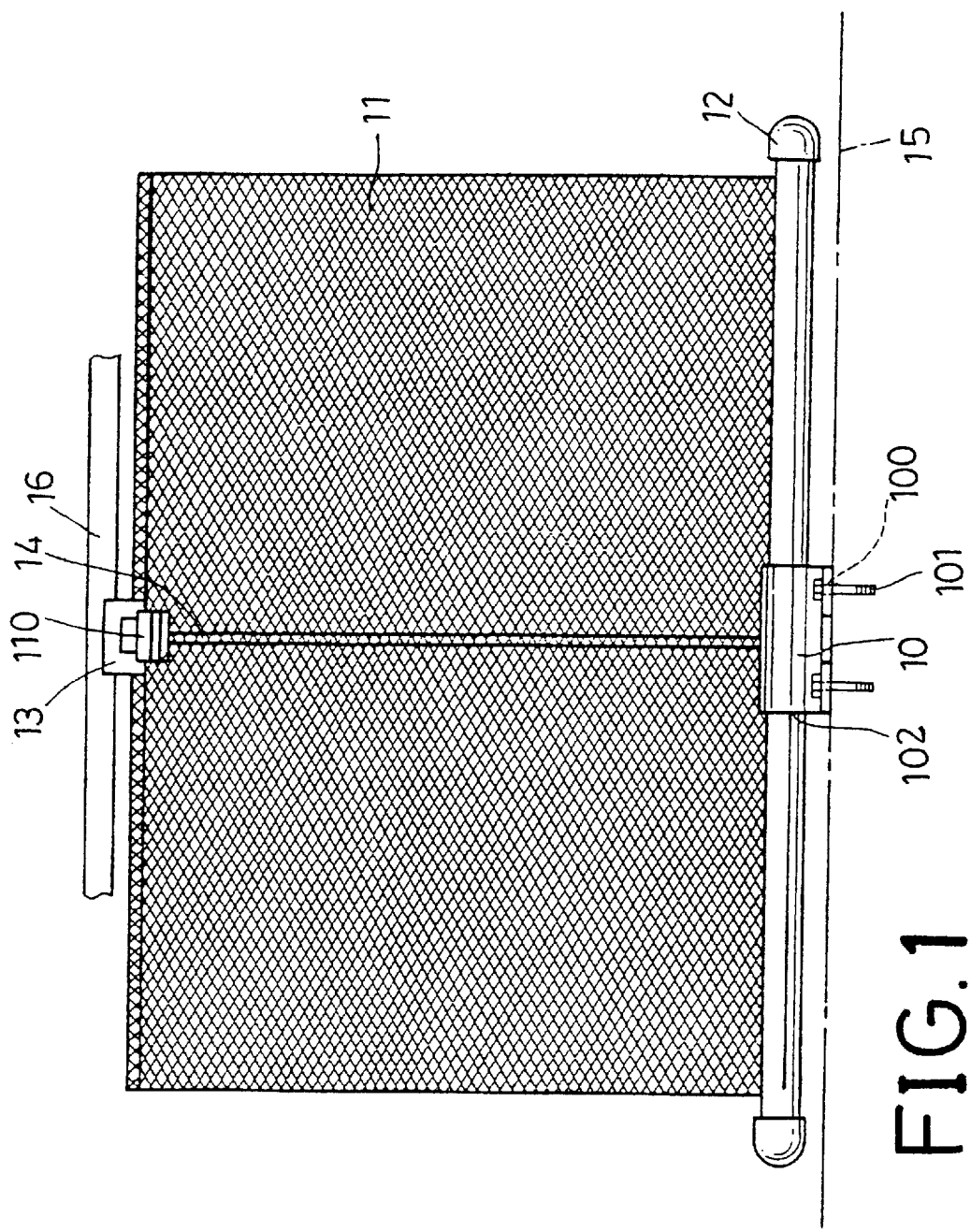
FIG. 1 is a front view of a known conventional windshield sunshade of an automobile.
Figure 2:
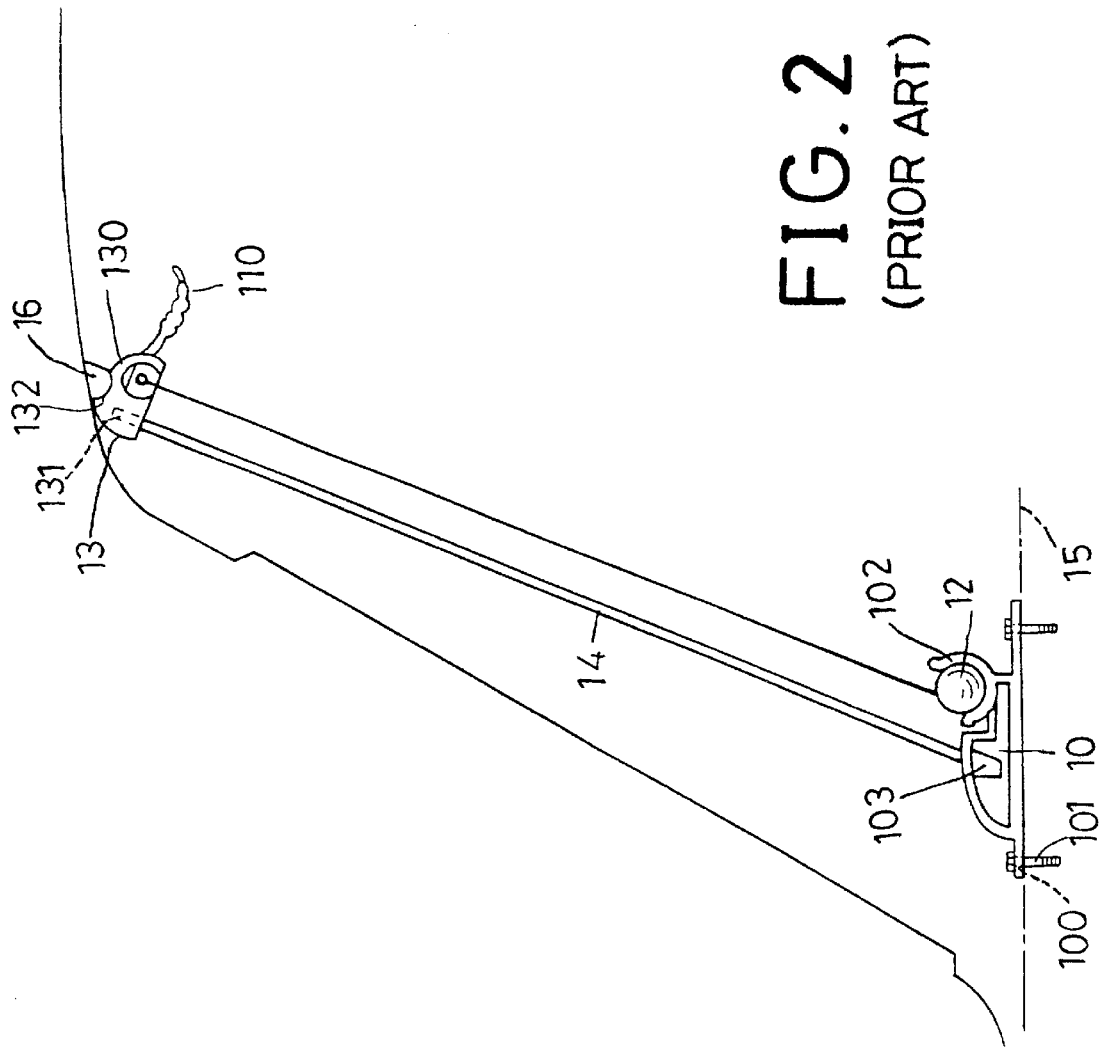
FIG. 2 is a side view of the known conventional windshield sunshade of an automobile.
Figure 3:
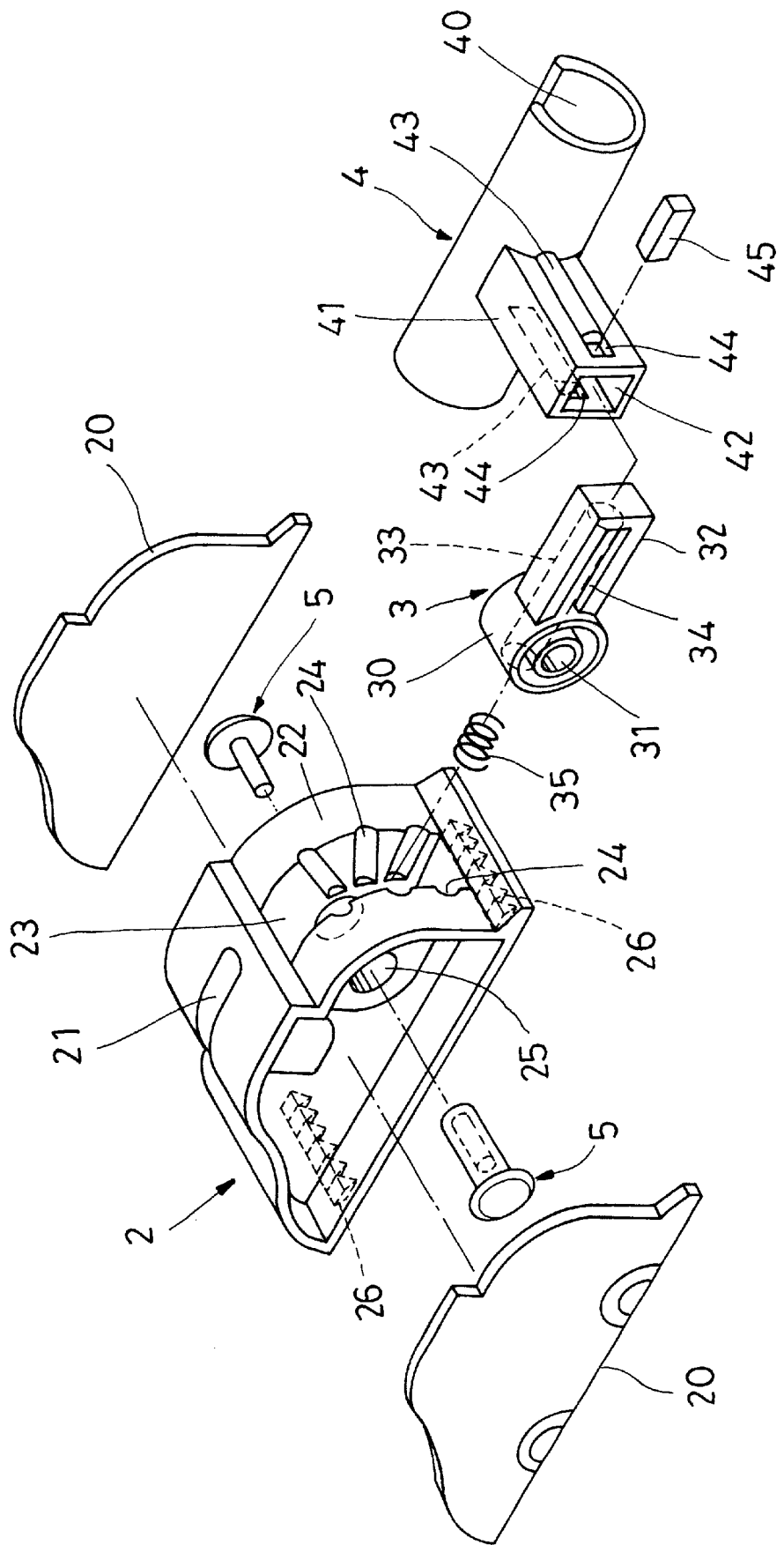
FIG. 3 is an exploded perspective view of a base assembly for a windshield sunshade of an automobile in the present invention.

A preferred embodiment of a base assembly for a windshield sunshade of an automobile in the present invention, as shown in FIG. 3, includes a base unit 2, a pivot coupler 3, a sunshade holder 4, and pivot members 5 combined together. The base unit 2 has two side plates 20 respectively located at a left and a right side, an insertion recess 21 formed in an upper side, a curved sidewall 22 disposed at a front side, an engagement portion 23 formed in a middle portion of the curved sidewall 22, a central through hole 25 passing through the engagement portion 23, a plurality of solid claw members 26 disposed under a bottom side. There is a plurality of engagement recesses 24 each two respectively disposed in two opposite sidewall of the engagement portion 23.

The pivot coupler 3 has a pivot base 30 disposed at one end thereof. The pivot base 30 has a central hole 31 in a middle portion and a coupling rod 32 lengthwisely extending from one sidewall of the pivot base 30. A cavity 33 is located in an interior of the pivot base 30, passes through the central through hole 31 and extends to the coupling rod 32. Two opposite grooves 34 are located at two opposite sidewalls of the coupling rod 32 and communicate with the cavity 33. A spring 35 is placed in the cavity 33.

The sunshade holder 4 houses the coupling rod 32 of the pivot coupler 3 and have a curved-up plate 40 with a coupling housing 41 lengthwisely extending at one sidewall thereof. A chamber 42 disposed in an interior of the coupling housing 41. Two opposite projecting ridges 43 are positioned at two opposite sidewalls of the coupling housing 41 and extend to an outer surface of the curved-up plate 40. Two opposite insertion holes 44 are disposed at two opposite sidewalls of the coupling housing 41 and communicate with the chamber 42. An insertion block 45 is inserted through the two opposite insertion holes 44.

Pivot members 5 are inserted through the central through hole 25 of the base unit 2 and the central through hole 31 of the pivot base 30 of the pivot coupler 3 so as to pivotally combine the pivot coupler 3 with the base unit 2.

Figure 4:
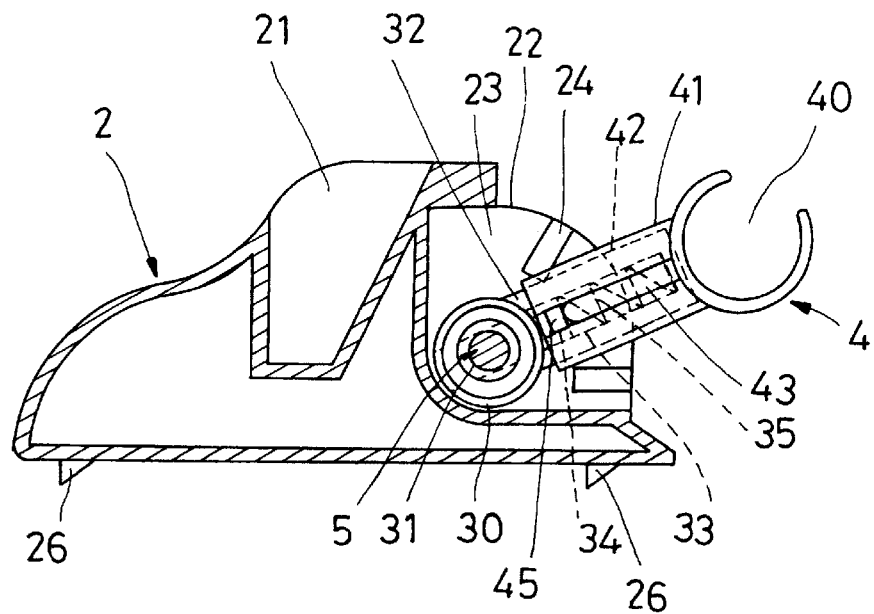
FIG. 4 is a side view in section of the base assembly for a windshield sunshade of an automobile in the present invention, showing a coupling rod of a pivot coupler being housed by a coupling housing of a sunshade holder.

In assembling, referring to FIGS. 3 and 4, firstly, place the spring 35 into the cavity 33 of the pivot coupler 3, and then insert the coupling rod 32 of the pivot coupler 3 into the chamber 42 of the sunshade holder 4 to make the two insertion holes 44 disposed at two opposite sidewalls of the coupling housing 41 aligned to the two opposite grooves 34 located at two opposite sidewalls of the coupling rod 32 so that the insertion block 45 can be inserted through the two opposite insertion holes 44 and the two opposite grooves 34 so as to limit against the spring 35 within the cavity 33, finishing the combination of the pivot coupler 3 and the sunshade holder 4.

Secondly, insert the pivot base 30 of the pivot coupler 3 which has been combined with the sunshade holder 4 into the engagement portion 23 of the base unit 2 to make the central through hole 31 of the pivot base 30 correspondent in position to the central through hole 25 of the base unit 2 so that the pivot members 5 can be inserted through the central through hole 31 and the central through hole 25, completing the pivotal combination of the pivot base 30 of the pivot coupler 3 with the base unit 2.

Thirdly, engage the two opposite projecting ridges 43 of the coupling housing 41 of the sunshade holder 4 with two opposite engagement recesses 24 in a position.

Finally, respectively attach the two side plates 20 to a left and a right sidewall of the base unit 2 so that the base unit 2 can present special designs, finishing assemblage of the base assembly. Thus, The base assembly is assembled and cleaned easily and quickly.

Figure 5:
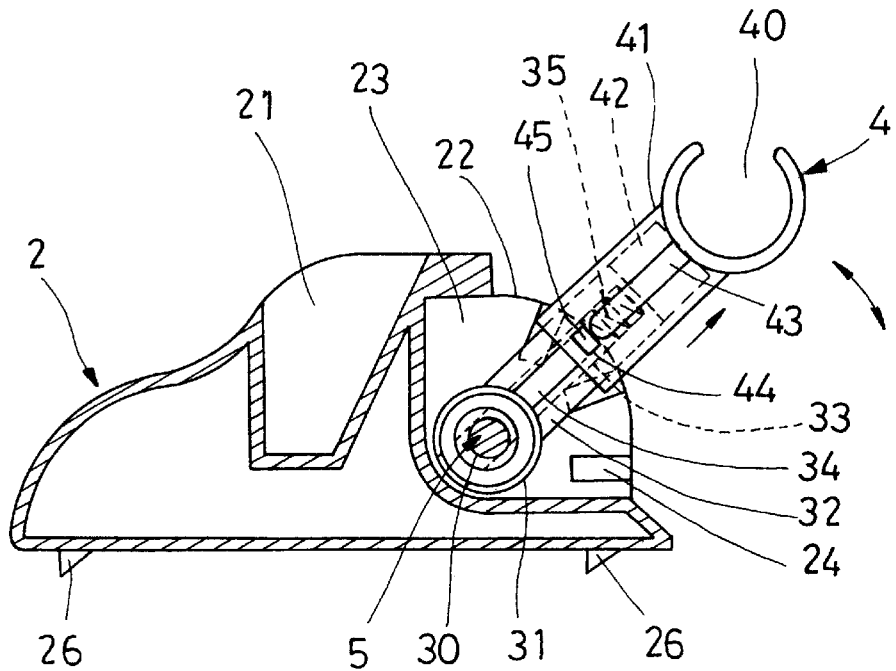
FIG. 5 is a side view in section of the base assembly for a windshield sunshade of an automobile in the present invention, showing the sunshade holder being manually pulled outwardly from the coupling rod of the pivot coupler and adapted to be rotated with various angles; and, FIG. 6 is a schematic view of the base assembly for a windshield sunshade of an automobile in the present invention, showing a shade curtain and the sunshade holder being operated in practical use.
Figure 6:
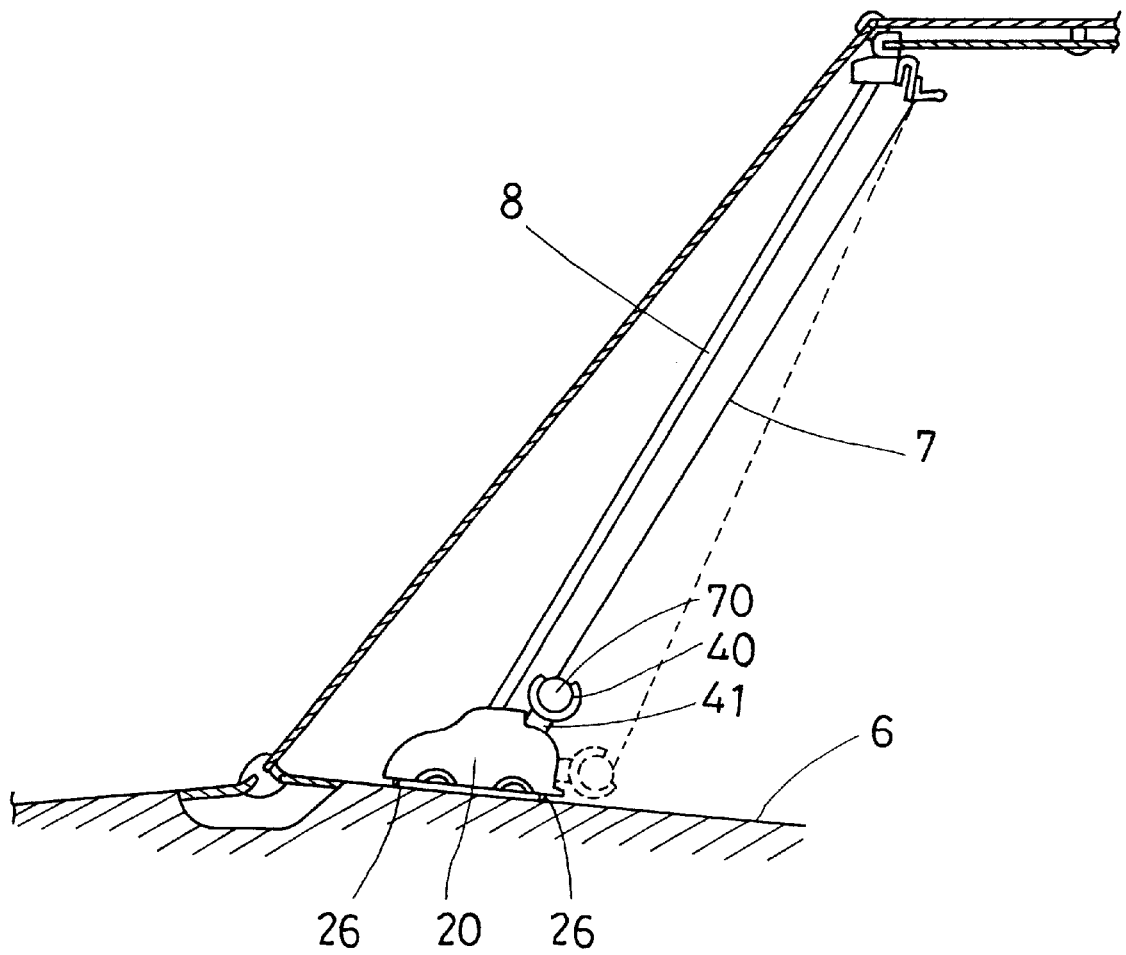

In using, referring to FIGS. 4, 5 and 6, fix the base unit 2 on a flat surface 6 in front of the rear windshield of an automobile with the solid claw members 26 disposed under a bottom side. Insert a lower end of a support rod 8 in the insertion recess 21 of the base unit 2. And then, mount a circular rod 70 disposed at a bottom of a shade curtain 7 into the curved-up plate 40 of the sunshade holder 4. In case of adjusting the sunshade holder 4 with various angles, outwardly pull the sunshade holder 4 to make the insertion block 45 slided in the opposite grooves 34 of the coupling rod 32 with the outward movement of the sunshade holder 4 to compress the spring 35 disposed in the cavity 33 of the pivot coupler 3, by which the two opposite projecting ridges 43 of the sunshade holder 4 will be separated from the current two opposite engagement recesses 24 of the base unit 2 so as to permit the sunshade holder 4 rotated and adjusted with various angles. Once the sunshade holder 4 is rotated and adjusted to a desired angle, release the sunshade holder 4 so that the spring 35 so far compressed will recover elasticity to push the insertion block 45 to make the sunshade holder 4 back to its original position. At this time, the two opposite projecting ridges 43 of the sunshade holder 4 can be engaged with another two opposite engagement recesses 24 of the base unit 2, by which achieves the function of adjusting the sunshade holder 4 with various angles and makes the base assembly of the present invention more convenient in practical use than the conventional ones.

While the preferred embodiment of the invention has been described above, it will be recognized and understood that various modifications may be made therein and the appended claims are intended to cover all such modifications that may fall within the spirit and scope of the invention.

What is claimed is:

1. A base assembly for a windshield sunshade of an automobile having a base unit, a pivot coupler, a sunshade holder, and pivot members combined together, comprising:

said base unit having an insertion recess formed in an upper side, a plurality of solid claw members disposed under a bottom side, a curved sidewall disposed at a front side and having an engagement portion formed in a middle portion therein, and a central through hole passing through said engagement portion;

said pivot coupler having a pivot base disposed at one end, said pivot base having a central through hole in a middle portion;

said sunshade holder housing said pivot coupler and having a curved-up plate;

said pivot members pivotally connecting said pivot coupler with said engagement portion of said base unit; and, characterized by said engagement portion of said base unit having a plurality of engagement recesses disposed in two opposite sidewalls of the engagement portion therein;

said pivot base of said pivot coupler having a coupling rod disposed at one side, a cavity located in an interior therein and passing through said central through hole of said pivot base and extending to an interior of said coupling rod, two opposite grooves respectively disposed in two opposite sidewalls of said coupling rod, and a spring placed in said cavity;

said curved-up plate of said sunshade holder having a coupling housing disposed at one side, a chamber located in an interior of said coupling housing for housing said coupling rod of said pivot coupler, two projecting ridges respectively positioned at two opposite sidewalls of said coupling housing and extending to said curved-up plate and engaged with said engagement recesses of said base, two insertion holes respectively disposed at said two opposite sidewalls of said coupling housing and communicating with said chamber, an insertion block inserted through said two insertion holes of said coupling housing and said two opposite grooves of said coupling rod and adapted to bear against said spring within said cavity of said coupling rod of said pivot coupler; and, whereby said sunshade holder is outwardly pulled to make said insertion block slide in said grooves of said coupling rod with an outward movement of said sunshade holder to compress said spring disposed in said cavity of said pivot coupler, and said two projecting ridges of said sunshade holder can be separated from said two opposite engagement recesses of said base unit to permit said sunshade holder to rotate and adjusted to various angles, and once said sunshade holder is rotated and adjusted to a desired angle, said sunshade holder is released so that said compressed spring pushes said insertion block to its original position and said two opposite projecting ridges of said sunshade holder can be engaged with another two said opposite engagement recesses of said base unit in a new position.

2. A base assembly for a windshield sunshade of an automobile as claimed in claim 1, wherein side plates are attached at a left and a right side of said base unit.

* * * * *